United States Patent [19]

Okada

[11] 4,083,393
[45] Apr. 11, 1978

[54] NUT

[75] Inventor: Hirosi Okada, Seto, Japan

[73] Assignee: Mitsuchi Corporation, Nagoya, Japan

[21] Appl. No.: 792,411

[22] Filed: Apr. 29, 1977

[30] Foreign Application Priority Data

Jul. 16, 1976   Japan ................................. 51-85537

[51] Int. Cl.² ............................................. F16B 39/36
[52] U.S. Cl. .................................................. 151/19 A
[58] Field of Search ............... 151/19 A, 19 R; 85/33, 85/36

[56] References Cited

U.S. PATENT DOCUMENTS

| | | | |
|---|---|---|---|
| 2,393,764 | 1/1946 | Frank | 85/33 X |
| 2,489,613 | 11/1949 | Beswick | 85/33 |
| 2,576,579 | 11/1951 | Donovan | 151/19 R |
| 2,814,324 | 11/1957 | Shur | 151/19 R |
| 3,151,652 | 10/1964 | Sahodiakin | 151/19 R |

FOREIGN PATENT DOCUMENTS

| | | | |
|---|---|---|---|
| 88,757 | 6/1922 | Austria | 151/19 A |
| 501,238 | 2/1951 | Belgium | 151/19 A |

*Primary Examiner*—Ramon S. Britts
*Attorney, Agent, or Firm*—Martin A. Farber

[57] ABSTRACT

Nut which is separated into segments so that the segments can be expanded or contracted being guided at a tapered hole formed in the nut segments, characterized in that a tapered hole has an inlet port at a narrower end and an insertion hole at a broader end so that a bolt to be fastened can penetrated therethrough; nut segments have guide pins at their back which are always urged by a spring toward the narrower side of the tapered hole, and an operation ring is rotatably fitted to the outer periphery of the main body, and the operation ring is provided with a cam part which, when the operation ring is turned, moves the guide pins toward the broader side of the tapered hole against the spring to keep the positions of the nut segments, or releases the guide pins so that the nut segments are restored to the narrower side of the tapered hole by the force of the spring.

14 Claims, 5 Drawing Figures

U.S. Patent  April 11, 1978  4,083,393
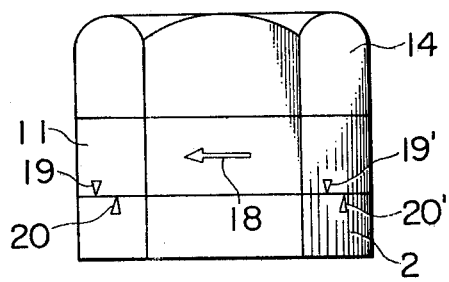
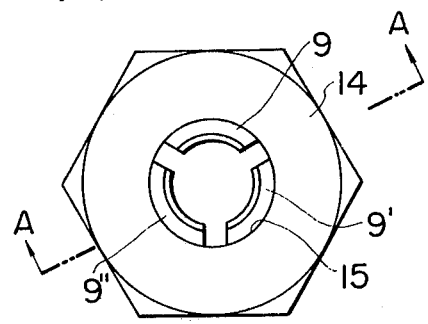
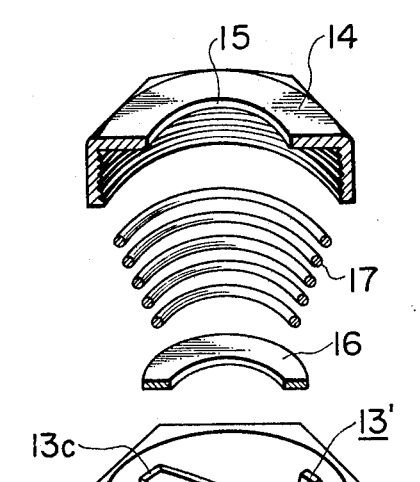
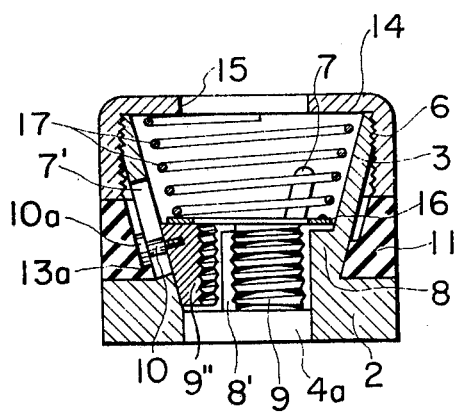
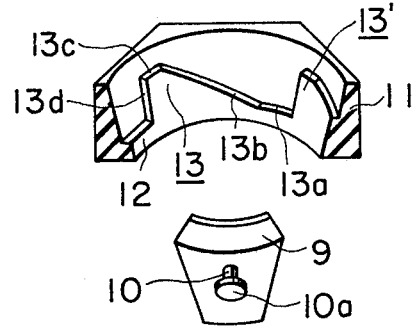
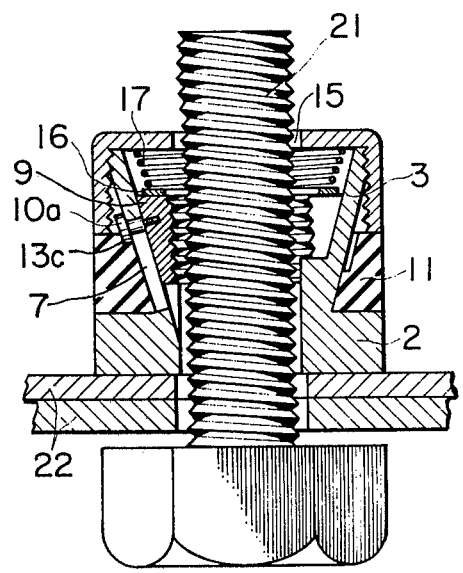
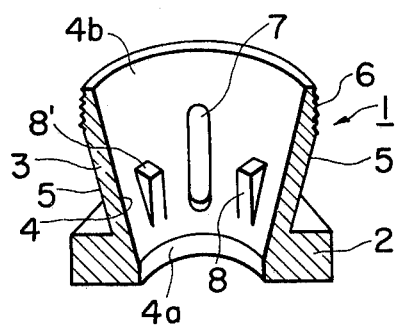

NUT

FIELD OF THE INVENTION

The present invention is to provide a nut which constitutes a tool part of a machine, which provides very easy fastening and removing operations with respect to bolts and which provides reliable operation even for long bolts and short bolts.

SUMMARY OF THE INVENTION

The present invention provides a nut which is separated into segments so that the segments can be expanded or contracted being guided in a tapered hole formed in the nut, characterized in that the tapered hole has an inlet port at a narrower end and an insertion hole at a broader end so that a bolt can penetrate therethrough. The nut segments have guide pins at their back which are always urged by a spring toward the narrower side of the tapered hole. An operation ring is rotatably fitted to the outer periphery of the main body, and the operation ring is provided with a cam part which, when the operation ring is turned, moves the guide pins toward the broader side of the tapered hole against the spring to keep the positions, or releases the guide pins so that the nut segments are restored to the narrower side of the tapered hole by the force of the spring.

BRIEF DESCRIPTION OF THE DRAWINGS

The drawings shown an embodiment of the present invention, in which

FIG. 1 is a front view,

FIG. 2 is a plan view,

FIG. 3 is a cross-sectional perspective view showing a nut in a disassembled state, FIG. 4 is a cross-sectional view of a nut cut across line A—A of FIG. 2, and FIG. 5 is a vertical cross-sectional view showing a state in which nut segments are separated from a bolt by manipulating an operation ring.

DETAILED DESCRIPTION OF THE INVENTION

The present invention is illustrated below with reference to an embodiment shown in the accompanying drawings. The reference numeral 1 stands for a casing or nut body having at its lower part a base part 2 of a polygonal outer surface like a conventional nut and having at its upper part a guide cylinder 3 of a reversed cone shape formed in a unitary structure. Inside the guide cylinder 3 forms a tapered hole 4 expanded toward the upper direction, having an opening 4b at the upper end and an insertion hole 4a at the lower end. On the outer side of the guide cylinder 3 are further formed a circular guide surface 5 at a middle part and a screw 6 at an upper part. The reference numeral 7 stands for guide holes penetrating through the guide cylinder 3 at positions to equally divide the periphery of the guide cylinder 3 into three.

The reference numeral 8 stands for a guide pawl that is provided in the tapered hole 4 and at a position halfway between the guide holes 7. The reference numeral 9 stands for three separated nut segments; each of the nut segments 9 can slide up and down on the surface of the tapered hole 4 between the guide pawls 8. The reference numeral 10 represents a guide pin provided at the back surface of the nut segment 9, and which guide pin 10 is inserted in the guide hole 7. A tip of the guide pin 10 is expanded to a large-diametered part 10a. The guide cylinder 3 is held between the large-diametered part 10a and the back surface of the nut segment 9; the nut segment 9 slides along the surface of the tapered hole 4. The reference numeral 11 is an operation ring for the nut segments 9, and its outer periphery may be formed to a polygonal shape like the base part 2 of the aforesaid casing 1. On the inner surface of the operation ring 11 there is formed a circular slide surface 12 which is disposed along the outer surface 5 of the middle part of the guide cylinder 3. The circular slide surface 12 is rotatably fitted to the outer surface 5 of the guide cylinder 3 as shown in the diagrams. On the inner surface of the operation ring 11 there are further equally formed three cam parts 13 consisting of a lower flat (perpendicular to the axis of the nuts) surface 13a, inclined surface 13b, upper flat surface 13c, and vertical surface 13d. Onto the cam parts 13 there are placed and fitted the guide pins 10 of the nut segments 9. The reference numeral 14 is a cap having at its center a bolt insertion hole 15, which cap will be screwed to the screw part 6 of the guide cylinder 3. The outer periphery of the cap 14 may be formed to a polygonal shape like the base part 2 of the casing 1. The reference numeral 16 designates a washer placed abuttingly on the upper surfaces of the three nut segments 9 to press them equally, and the reference numeral 17 denotes a spring provided between the washer 16 and said cap 14 to always urge the nut segments 9 toward the narrower side of the tapered hole 4. On the oute surface of the operation ring 11 is engraved an arrow 18 to indicate the turning direction of the operation ring 11 so that the inclined surface 13b will lift up the guide pins 10. Further, on the outer surfaces of the operation ring 11 and the base part 2 are engraved markings 19, 20 that will be brought into alignment when the guide pins 10 are positioned at the upper flat surface 13c. The reference numeral 21 represents a bolt, and the reference numeral 22 stands for a member that is to be fastened.

Below is illustrated how to fasten the nut to the bolt 21 via the member 22 that is to fastened.

First, the operation ring 11 is set to a position at which the lower flat surface 13a is in alignment with the guide pin 10 of the nut segment 9. If now the guide pin 10 is positioned on the inclined surface 13b, the operation ring 11 is turned automatically by the pressing force of the spring 17 so that the guide pin 10 is lowered to the lower flat surface 13a; the operation ring 11 can be set easily. After the operation ring 11 is so set, if the nut is inserted at its insertion hole 4a with the narrower side of the tapered hole 4 onto the bolt 21 via the member 22 to be fastened without turning the nut, the screw thread of the bolt 21 and the screw thread of the nut segment 9 are engaged together, so that the three nut segments 9 are moved toward the broader side of the tapered hole 4 against the force of the spring 17. The diameter of the screw hole constituted by the three nut segments 9 is expanded gradually. And when the inner diameter of the screw hole becomes larger than the outer diameter of the bolt 21, the bolt 21 will simply pass therethrough. Therefore, the nut segments pass over the screw thread of the bolt against the force of the spring producing a clicking sound, and are inserted onto the bolt. In this way, without the need of turning, the nut which is simply pressed is inserted onto the bolt. After the nut has been inserted until its lower surface comes into contact with the member 22 that is to be fastened, then the nut may be turned twice or three times in the fastening direction to complete the fastening operation.

To remove the so fastened nut, on the other hand, the nut may be turned two to three times in the loosening direction. Thereafter, the operation ring 11 is turned in the direction of arrow 18 so that the marking 19 comes into alignment with the marking 20 on the base part. If so turned, the cam parts 13 provided inside therein are turned also, and the inclined surfaces 13b raise the nut segments 9 via the guide pins 10 against the force of the spring 17. The nut segments 9 are thereby stopped with their guide pins 10 at the upper flat surface 13c. The nut segments 9 thereby have moved along the tapered hole surface toward the broader portion of the tapered hole 4; the inner diameter of the screw hole constituted by the nut segments 9 is therefore expanded to be larger than the outer diameter of the screw thread of the bolt 21, and the expanded state is maintained (the state of FIG. 5). Therefore, the screw thread of the nut segments 9 and the screw thread of the bolt 21 disengage; the bolt 21 then can be pulled out easily without the need of turning it.

Furthermore, to restore the nut segments 9 to the initial state from the above state (to lower the segments in the drawing), the operation ring 11 is further turned in the direction of arrow 18. The large-diametered part 10a of the guide pin 10 is lowered from the vertical surface 13d of the cam part 13 down to the lower flat surface 13a due to the pressing force of the spring 17, and the nut segments 9 are returned to the initial state.

According to the present invention as mentioned above, the nut can be inserted from the tip of the bolt by simply pressing it all the way to a determined fastening position. Hence as compared to the conventional nuts that have to be turned all the way, the fastening operation of the nut of the present invention is quite simplified. In removing the nut from the bolt according to the present invention, the nut may simply be pulled out without the need of turning it all the way, contributing to simplification of the operation. In addition, the nut according to the present invention can be used for bolts that are so long as to penetrate through the nut or for bolts that are so short as to be engaged a little with the nut segments.

What is claimed is:
1. A nut comprising
a nut body having a polygonal base part on an outer surface thereof and being formed with an inner surface defining a tapered hole widening upwardly and narrowing downwardly, said base part having an upper surface and a bearing end face,
a plurality of individual nut segments disposed in said tapered hole of said nut body, said nut segments being mounted slidably upwardly and downwardly, respectively, on said inner surface of said tapered hole,
guide pins extending from said nut segments, respectively,
spring means for continuously biasing said nut segments downwardly toward a narrower side of said tapered hole,
an operation ring rotatably mounted on said upper surface of said base part of said nut body, said operation ring including cam sections, each of the latter comprising a lower flat surface, an upper flat surface and an inclined surface connecting said upper flat surface with said lower flat surface, said lower and upper flat surfaces extending substantially parallel to the bearing end face of said base part, said cam sections engage said guide pins of said individual nut segments, respectively, to control said nut segments, whereby said nut segments are slidable upwardly on said inner surface of said tapered hole by rotation of said operation ring as well as by lifting of said nut segments and said guide pins therewith off said cam sections, respectively.

2. The nut as set forth in claim 1, further comprising
first and second marking means on said operation ring and on said base part, respectively, for indicating positioning of said guide pins on said flat surfaces of said cam sections by correspondence of said first and second marking means.

3. The nut as set forth in claim 2, wherein
said first and second marking means are engraved on said operation ring and on said base part, respectively, and are aligned when said guide pins engage said upper flat surfaces of said cam sections, respectively, whereby said nut segments are disposed in a wider upper side of said tapered hole and are further apart from one another than when said nut segments are in a lower narrower side of said tapered hole.

4. The nut as set forth in claim 1, further comprising
vertically extending guide pawl means projecting inwardly from said nut body in said tapered hole constituting tracks for guiding said nut segments slidably upwardly and downwardly.

5. The nut as set forth in claim 1, wherein
said nut body is formed with a plurality of longitudinal guide holes,
said guide pins project through said guide holes, respectively, and operatively engage said cam sections adjacent an outer peripheral surface of said nut body.

6. The nut as set forth in claim 5, wherein
said guide pins are each formed with a large-diameter free end slidably engaging said cam sections and said outer peripheral surface of said nut body.

7. The nut as set forth in claim 1, wherein
said cam sections each include a vertical surface connecting said lower flat surface with said upper flat surface.

8. The nut as set forth in claim 1, wherein
said cam sections are identically formed and circumferentially connected to one another all around.

9. The nut as set forth in claim 1, wherein
said cam sections and said surfaces thereof face upwardly, said spring means for biasing said guide pins against said cam sections and said surfaces thereof presses downwardly.

10. The nut as set forth in claim 1, wherein
said nut segments have inner teeth adapted to operatively cooperate with a threaded bolt disposed in said tapered hole inside of said nut segments.

11. The nut as set forth in claim 1, wherein
said nut body has an upper threaded outer peripheral surface,
a cap threadedly engages said upper threaded outer periheral surface of said nut body, said cap extends adjacent to said operation ring, said cap is formed with an upper annular portion defining a bolt insertion hole communicating with said tapered hole, said spring means abuts said annular portion.

12. The nut as set forth in claim 11, further comprising an annular washer abutting said plurality of nut segments and said spring means.

13. The nut as set forth in claim 1, wherein
said inner surface of said tapered hole is continuously smoothly tapered entirely against said nut segments and said nut segments each have a back entirely tapered complementary and slidable upwardly and downwardly theregainst, guide means for guiding said nut segments slidably upwardly and downwardly and for completely preventing rotation of said nut segments relative to said nut body.

14. The nut as set forth in claim 1, wherein
said spring means is a helical compression spring axially disposed above said nut segments and operatively simultaneously pressing the latter downwardly.

* * * * *